(12) United States Patent
Strebel et al.

(10) Patent No.: US 7,375,162 B2
(45) Date of Patent: May 20, 2008

(54) FILLED PROPYLENE POLYMER COMPOSITIONS HAVING IMPROVED MELT STRENGTH

(75) Inventors: Jeffrey J. Strebel, Cincinnati, OH (US); Sameer D. Mehta, Maston, OH (US); Jeffrey A. Jones, Morrow, OH (US)

(73) Assignee: Equistar Chemicals, LP, Houston, TX (US)

( * ) Notice: Subject to any disclaimer, the term of this patent is extended or adjusted under 35 U.S.C. 154(b) by 220 days.

(21) Appl. No.: 11/290,060

(22) Filed: Nov. 30, 2005

(65) Prior Publication Data

US 2006/0100382 A1    May 11, 2006

Related U.S. Application Data

(63) Continuation-in-part of application No. 10/447,367, filed on May 29, 2003, now abandoned.

(51) Int. Cl.
*C08F 8/00* (2006.01)
*C08L 23/04* (2006.01)

(52) U.S. Cl. .............. 525/240; 525/100; 525/106; 525/50

(58) Field of Classification Search ............ 525/50, 525/240, 100, 106
See application file for complete search history.

(56) References Cited

U.S. PATENT DOCUMENTS

| | | | |
|---|---|---|---|
| 3,225,018 A | 12/1965 | Zutty | |
| 3,392,156 A | 7/1968 | Donaldson | |
| 3,646,155 A | 2/1972 | Scott | |
| 4,433,073 A | 2/1984 | Sano et al. | |
| 5,017,714 A | 5/1991 | Welborn, Jr. | |
| 5,266,627 A | 11/1993 | Meverden et al. | |
| 5,312,861 A | 5/1994 | Meverden et al. | |
| 5,324,820 A | 6/1994 | Baxter | |
| 5,371,144 A | 12/1994 | Brosius et al. | |
| 5,639,818 A | 6/1997 | Lee et al. | |
| 5,925,703 A | 7/1999 | Betso et al. | |
| 6,207,754 B1 | 3/2001 | Yu | |
| 6,281,288 B1 | 8/2001 | Bickert et al. | |
| 6,583,209 B2 | 6/2003 | Mehta et al. | |
| 6,803,421 B2 | 10/2004 | Joseph | |
| 2004/0242776 A1 | 12/2004 | Strebel et al. | |

OTHER PUBLICATIONS

Zwaan, J.: "PropaFoam and FMP New Engineered PP Foams for Automotive Applications," EUROMAT 99, Biannu. Meet. Fed. Euro. Mate 13/69 AMNI (2000), pp. 367-373.

Ross, James F., et al.: "An Improved Gas-Phase Polypropylene Process." *Ind. Eng. Chem. Prod. Res. Dev.* (1985): 24: 149-154.

*Primary Examiner*—Irina S Zemel
(74) *Attorney, Agent, or Firm*—Gerald A. Baracka; William A. Heidrich

(57) ABSTRACT

Filled propylene polymer compositions having significantly improved melt strength are provided. The compositions are blends of propylene polymer, mineral filler with an ethylene polymer component consisting of an ethylene plastomer and a silane-containing ethylene polymer.

13 Claims, No Drawings

FILLED PROPYLENE POLYMER COMPOSITIONS HAVING IMPROVED MELT STRENGTH

CROSS-REFERENCE TO RELATED APPLICATION

This is a continuation-in-part of U.S. patent application Ser. No. 10/447,367, filed May 29, 2003, now abandoned.

FIELD OF THE INVENTION

The present invention relates to filled propylene polymer compositions having improved melt strength. More specifically, the compositions are blends of a propylene polymer, filler and a combination of plastomer and silane-containing polyolefin.

DESCRIPTION OF THE PRIOR ART

Propylene polymer resins have enjoyed significant growth in recent years in view of the diverse resin types which are available. In addition to propylene homopolymer, numerous copolymers of propylene with ethylene and other α-olefins are now commercially produced. These include random copolymers, block copolymers and multi-phase polymer systems. This latter group of resins includes the so-called impact copolymers, thermoplastic polyolefins (TPOs) and thermoplastic elastomers (TPEs) which consist of a continuous phase of a crystalline polymer, e.g., highly isotactic propylene homopolymer, having a rubbery phase, e.g., ethylene-propylene copolymer, dispersed therein.

Filled resins of the above types are widely used in extrusion for the production of films, fibers and a wide variety of molded goods, such as bottles, hose and tubing, auto parts and the like. While it is necessary that these resins have sufficiently low melt viscosity under conditions of high shear encountered in the extruder in order to have acceptable processability and achieve the high throughputs necessary for commercial operations, the resin must also have sufficient melt strength after extrusion to prevent sagging/distortion of the extrudate before it is cooled below the melt point. For example, a blow molding resin suitable for the production of shampoo bottles may not have sufficient melt strength for production of one-gallon jugs where the parison is substantially larger and heavier.

High melt strength resins are particularly advantageous for the production of large thermoformed and blow molded articles, for extrusion coating and for foamed and sheet extrusions. With thermoforming, also referred to as vacuum forming, a plastic sheet is heated to a pliable state and then formed into the desired shape by forcing it against a mold using vacuum or positive air pressure. Articles can also be thermoformed by mechanical means, e.g., by the use of matched molds. As the plastic cools it retains the shape of the mold. While thermoforming provides significant processing advantages over injection molding for the fabrication of large parts, many propylene polymer compositions do not have sufficient melt strength for certain of these applications. Low melt strength can produce excessive sag during the heating and/or forming cycle.

U.S. Pat. No. 5,639,818 discloses a process for increasing the melt strength of polypropylene/polyethylene blends utilizing peroxide. For the process, a high propylene content polymer and non-crosslinked ethylene polymer which has been precontacted with an organic peroxide is melt-mixed at a temperature above the decomposition temperature of the peroxide. Alternatively, the peroxide may be adsorbed on a PP/PE blend prior to the melt-mixing. Non-crosslinked ethylene polymers disclosed for use in the process include copolymers of ethylene with silanes, vinyl acetate, methyl acrylate, n-butylacrylate and α, ω-dienes.

In U.S. Pat. No. 6,583,209, propylene polymer composites having improved melt strength are obtained by incorporating 0.5 to 12 weight percent (wt. %) organically modified clay and 0.5 to 12 wt. % compatibilizing agent with a propylene polymer base resin.

It would be advantageous if propylene polymer compositions having improved properties were available without the use of peroxide or the addition of modified clays and compatibilizng agents. U.S. Pat. No. 6,803,421 discloses such compositions. The reference discloses that the dimensional stability of filled propylene-ethylene copolymers can be improved by incorporating ethylene-$C_{4-8}$ α-olefin plastomers in the formulation. The compositions are comprised of 45 to 90 weight percent propylene-ethylene copolymer, 5 to 35 weight percent ethylene-$C_{4-8}$ α-olefin plastomer and 5 to 40 weight percent mineral filler.

It would be even more advantageous if further improvement in the melt strength of such filled propylene polymers were possible. This is accomplished with the improved compositions of the invention which are described in detail to follow.

SUMMARY OF THE INVENTION

The present invention provides filled propylene polymer compositions having significantly improved melt strength which makes them particularly well suited for thermoforming large parts. More specifically, the compositions are blends of a propylene polymer, filler and a combination of plastomer and silane-functionalized polyolefin.

The compositions are comprised of 50 to 85 weight percent (wt. %) propylene polymer base resin, 5 to 35 wt. % mineral filler and 5 to 25 wt. % of an ethylene polymer component consisting of an ethylene-$C_{4-8}$ α-olefin plastomer and silane-containing ethylene polymer present at a weight ratio (plastomer:silane copolymer) of 3:1 to 1:3. The propylene polymer base resin can be a homopolymer, copolymer or mixture thereof. Preferably, the propylene polymer base resin has a melt flow rate from 0.01 to 50 g/10 min.

Plastomers employed are ethylene-$C_{4-8}$ α-olefin copolymers having densities of 0.86 to 0.92 g/cm$^3$ and melt indexes from 0.1 to 50 g/10 min. It is most advantageous when the plastomer is a copolymer of ethylene with butene-1, hexene-1, octene-1, or mixtures thereof and has a density of 0.86 to 0.90 g/cm$^3$ and melt index of 1 to 20 g/10 min.

The silane-containing polymer is an ethylene polymer containing 0.1 to 20 wt. % vinyltrialkoxysilane comonomer of the formula $H_2C=CHSi(OR)_3$ where R is a $C_{1-4}$ alkyl group. Especially useful silane-containing polymers are polymers of ethylene and 0.25 to 7.5 wt. % vinyltrimethoxysilane or vinyltriethoxysilane. The silane comonomer is incorporated in the ethylene polymer by copolymerization or grafting.

Highly useful filled compositions contain 7.5 to 30 wt. % mineral filler, preferably talc. It is even more useful if the talc has an average particle size between about 0.2 and 10 microns.

Other optional ingredients such as dispersion aids and promoters may also be included in the compositions.

DETAILED DESCRIPTION

The filled propylene polymer compositions of the invention have a balance of properties making them suitable for a wide variety of applications. They exhibit good low temperature ductility and have a good balance of impact/stiffness. Additionally, the compositions of the invention exhibit significantly improved melt strength. This combination of properties makes the compositions especially well suited for use in thermoforming applications.

The compositions of the invention are blends of 50 to 85 wt. % propylene polymer base resin, 5 to 35 wt. % mineral filler and 5 to 25 wt. % of an ethylene polymer component consisting of an ethylene-$\alpha$-olefin plastomer and silane-containing ethylene polymer. The compositions have melt flow rates (MFRs) from about 0.1 to 30 g/10 min and, more preferably, from 0.5 to 15 g/10 min. MFRs referred to herein are determined in accordance with ASTM D 1238 at 230° C. and 2.16 Kg load. In those instances where a melt index (MI) is specified, the MI is determined using test method ASTM D 1238 at 190° C. and 2.16 Kg load. Weight percentages preferred to herein are based on the total weight of the composition.

Particularly useful compositions contain 55 to 80 wt. % of the propylene polymer base resin.

Any of the widely known and commonly used thermoplastic propylene polymer resins which includes homopolymers, copolymers and blends thereof can be utilized as the base resin. Copolymers can include random, block, impact and thermoplastic polyolefin (TPO) copolymers where propylene is the major, i.e., greater than 50 weight percent, monomer constituent. Comonomers can include ethylene and $C_{4-8}$ $\alpha$-olefins. Copolymers of propylene and ethylene are particularly useful. The propylene polymer blends can be produced by physically blending two or more propylene polymers or they may be reactor-produced blends.

Useful propylene copolymers will contain 55 to 99.5 wt. % propylene and 0.5 to 45 wt. % ethylene. Even more preferred propylene polymer compositions comprise 65 to 99.5 wt. % propylene and 0.5 to 35 wt. % ethylene. These weight percentages are for the overall propylene polymer composition, so that if the composition is comprised of two or more different propylene polymer components, the monomer contents of the individual polymer components comprising the blend may be outside the specified ranges. MFRs of the propylene polymer will range from 0.01 to 50 g/10 min and, more preferably, from 0.1 to 30 g/10 min.

Propylene-ethylene copolymers comprised of two phases, i.e., a continuous phase of highly isotactic polypropylene homopolymer and a dispersed phase of rubber-like propylene-ethylene copolymer, are particularly useful. Depending on the relative proportion of the continuous and disperse phases, these compositions are classified as either impact copolymers or TPOs—the latter having a significantly higher rubber/elastomer content. Ethylene contents of these polymers will generally range up to about 30 wt. %.

In a particularly useful embodiment of the invention, the propylene polymer base resin is a TPO resin which is a propylene-ethylene copolymer comprised of crystalline (propylene homopolymer) and amorphous or rubber (ethylene-propylene copolymer) phases. Ethylene contents will be from 1 to 30 wt. % and, most preferably, from 6 to 22 wt. %. MFRs of the TPOs will range from 0.1 to 30 g/10 min and, more preferably, from 0.5 to 15 g/10 min. Ethylene-propylene rubber contents of the TPOs range from about 2 to about 50 wt. %.

TPOs employed for the invention are known and may be obtained by physically blending a propylene homopolymer (PP) with the requisite amount of ethylene-propylene rubber (EPR). They are, however, preferably reactor-made mixtures produced using gas-phase, stirred-bed polymerization processes. These processes utilize two reactors connected in series and high activity supported transition metal catalysts. In such processes, intimate mixtures of propylene homopolymer and ethylene-propylene copolymer are obtained directly from the polymerization process. As a result such TPOs are referred to as "reactor made" products to be distinguished from TPOs produced by post-reactor blending the individual polymer components, i.e., PP homopolymer and EPR.

More specifically for such processes, propylene is homopolymerized in a first reactor at a temperature from 50° C. to 100° C. and pressure from 250 psig to 650 psig utilizing a titanium catalyst and an organoaluminum cocatalyst. Preferably the temperature in the first reactor will be from 50° C. to 90° C. and the pressure will range from 300 psig to 450 psig. The highly isotactic homopolymer produced in the first reactor is then directly fed to a second reactor which is maintained at 25° C. to 80° C. and 100 psig to 500 psig where propylene and ethylene are copolymerized in the presence of the homopolymer. The amount of ethylene employed in the second reactor is sufficient to produce the copolymer with rubber-like characteristics. Polymerization in the second reactor is generally accomplished without additional catalyst; however, it may be advantageous to introduce more catalyst to the second reactor. If more catalyst is employed, it can be the same as the catalyst used in the first polymerization or different. Preferably, the second polymerization reactor is operated at 40° C. to 70° C. and 100 psig to 350 psig.

High activity titanium catalysts activated by contact with organoaluminum cocatalysts are utilized for these polymerizations. The polymerizations are carried out in the substantial absence of liquid reaction medium and gas velocity within the stirred-bed is maintained below the onset of fluidization. Depending on their compositional makeup, gases can be recirculated through external heat exchanges for cooling or partially condensed. Cooled monomer is recirculated into the reactor and provides thermal control. Recirculated monomer vaporizes when it is introduced into the reactor so that polymerization occurs in the gas phase. In the preferred mode of operation, i.e., stirred, fixed-bed gas phase, the first and second reactors are fitted with spiral agitators to maintain a turbulent mechanically fluidized bed of polymer powder and prevent agglomeration.

Each reactor typically has its own control system(s) and is capable of independent operation. In the usual conduct of the process, propylene and ethylene monomers are passed through desiccant beds prior to introduction. Means are usually provided to individually meter propylene, ethylene, hydrogen for molecular weight control, catalyst and cocatalyst. This makes it possible to more readily control and maintain the desired reactor conditions. If desired, monomer may be injected into the recirculated gas stream for introduction into the system. Residence times in both reactors are on the order of 1 to 4 hours.

The use of dual or cascading reactors for the homopolymerization and copolymerization of propylene and ethylene to produce ethylene copolymers is known. Similarly, gas-phase polymerizations utilizing stirred, fixed beds comprised of small polymer particles are also known. For additional information regarding gas-phase polymerizations and a schematic flow diagram of the process, reference may be made to the article by Ross, et al., in *Ind. Eng. Chem. Prod. Res. Dev.*, 1985, 24, pp 149-154, which is incorporated herein by reference.

A mineral filler is included with the base resin for the compositions of the invention. Mineral fillers are commonly employed in thermoformable compositions used for automotive applications to improve stiffness and other desirable properties. The filler will constitute 5 to 35 wt. % and, more preferably, 7.5 to 30 wt. % of the composition. Any of the conventional filler materials typically used with polyolefins can be employed. Such fillers can include calcium carbonate, clay, talc, kaolinite, wollastonite, pyrophillite, magnesium hydroxide, oxides of zinc and magnesium, silica and silicates, and the like.

The use of talc fillers is highly advantageous for the compositions of the invention. Useful talcs may be untreated or surface treated in accordance with known procedures. Talc surface treatments may include treatments with silanes, fatty acids, fatty acid metal salts or the like. Filler particle sizes may vary; however, it is generally preferred to utilize fillers having average particles sizes from about 0.2 to about 10 microns(μm). Talc having an average particle size between about 0.5 and 2.5 μm is particularly useful for formulating the thermoformable compositions of the invention.

To obtain the compositions of the invention which exhibit significantly improved melt strength an ethylene polymer component consisting of an ethylene-α-olefin plastomer and ethylene polymer containing silane functionality is included with the base resin and filler. The ethylene polymer component comprises 5 to 25 wt. % and, more preferably, 7.5 to 20 wt. % of the composition. The weight ratio of plastomer to silane polymer comprising the ethylene polymer component is from 3:1 to 1:3 and, more preferably, from 2.5:1 to 1:2.

Plastomers utilized for the ethylene polymer component are ethylene-based polymers, i.e., polymers having ethylene as the major constituent, prepared using metallocene catalysts. Metallocene or "single site" catalysts having at least one cyclopentadienyl or analogous ligand coordinated to a transition metal cation as well as plastomers produced using such catalyst systems are known. Metallocene catalysts and polymerization processes are described in U.S. Pat. Nos. 5,017,714 and 5,324,820 which are incorporated herein by reference.

Useful plastomers for the invention are copolymers of ethylene and $C_{4-8}$ α-olefin comonomers. Ethylene generally comprises from about 87 to about 97.5 mole % of the copolymer with the α-olefin comonomer(s) comprising from about 2.5 to 13 mole % of the copolymer. The plastomers have densities less than 0.92 g/cm$^3$ and, more typically, from 0.86 to 0.92 g/cm$^3$. Most preferably, plastomer densities will be from 0.86 to 0.90 g/cm$^3$. Plastomer copolymers are described in more detail in U.S. Pat. No. 6,207,754 which is incorporated herein by reference. Densities referred to herein are determined in accordance with ASTM D 1505.

The ethylene-α-olefin plastomers will have MIs from 0.1 g/10 min up to about 50 g/10 min. In a highly useful embodiment of the invention the plastomer MI will be from 1 to 20 g/10 min. Copolymers of ethylene with butene-1, hexene-1 and octene-1, or mixtures thereof, are highly useful plastomers. Such plastomers are available from commercial sources.

Silane-containing polymers utilized with the plastomer and which make up the ethylene polymer component are ethylene polymers having a silane comonomer incorporated into the polymer chain by copolymerization or attached to a polymer chain by grafting. Highly useful silane comonomers used for the copolymerization and/or grafting are vinyltrialkoxysilanes of the formula:

$H_2C\!=\!CHSi(OR)_3$ where R is a $C_{1-4}$ alkyl group. Vinyltrimethoxysilane (VTMOS), i.e., where R is a methyl group, and vinyltriethoxysilane (VTEOS), where R is an ethyl group, are particularly useful. The amount of vinylalkoxysilane incorporated can range from 0.1 to 20 wt. % and, more preferably, is in the range 0.25 to 7.5 wt. %. Useful silane-containing polymers have MIs from 0.05 to 50 g/10 min.; however, MIs preferably range from 0.1 to 20 g/10 min.

Silane grafted ethylene polymers are disclosed in U.S. Pat. No. 3,646,155 which is incorporated herein by reference. Silane-containing ethylene polymers obtained by copolymerizing ethylene with unsaturated alkoxysilanes are disclosed in U.S. Pat. Nos. 3,225,018 and 3,392,156 which are incorporated herein by reference.

One or more other olefin monomers may also be present with the ethylene and vinyltrialkoxysilane. α-Olefin comonomers are especially useful. When present, these comonomers may constitute up to 20 wt. % of the copolymer but are more preferably present in amounts less than 10 percent. Illustrative comonomers which can be present with the ethylene and vinyltrialkoxysilane include: α-olefins such as propylene, butene, hexene and octene; vinyl esters such as vinyl acetate and vinyl butyrate; carboxylic acids and their esters such as methacrylic acid, acrylic acid, methyl acrylate and methyl methacrylate; vinyl ethers such as methyl vinyl ether; acrylonitrile; and the like.

Graft-modified polymers are typically ethylene homopolymers or copolymers which can include high density polyethylene (HDPE), low density polyethylene (LDPE), linear low density polyethylene (LLDPE), medium density polyethylene (MDPE), very low density polyethylene (VLDPE) and ultra low density polyethylene (ULDPE). HDPE and LDPE grafted with VTMOS or VTEOS are particularly useful graft-functionalized silane-containing polyolefins.

The compositions of the invention may also contain other additives commonly used for the formulation of filled propylene polymer resins. These additives include but are not limited to processing aids, antioxidants, heat stabilizers, UV absorbers, dispersing agents, crystallization accelerators, antistatic agents, lubricants, promoters and the like. The total amount of such additives will typically not exceed about 5 wt. % of the composition and, most preferably, will range between about 0.01 and 2.5 wt. %.

For example, in one embodiment of the invention, the compositions will contain 0.01 to 1 wt. % of a dispersing agent to facilitate uniform incorporation of the filler in the polymer matrix and insure production of a homogeneous blend. Conventional dispersing or blending aids can be employed for this purpose. Examples of useful dispersing agents include maleated polypropylenes; silanes; neoalkoxy titanates; fatty acid derivatives, such as metal soaps, amides and esters; low molecular weight aliphatic resins; and the like. Many of these additives have multiple functions and may also function as processing aids, compatibilizing agents, slip agents, lubricants, mold release agents, etc. for the resulting compositions. In one highly useful embodiment the dispersion agent is a blend of a fatty acid metal soap and an amide. Blending aids of this type are commercially available.

While it is not necessary, one or more other compounds, referred to as promotors, may also be included in the formulations. These compounds are referred to as promotors since it is believed they function to further enhance melt strength by promoting crosslinking reactions. Useful promotors include organic bases, carboxylic acids and organometallic compounds including organic titanates and complexes or carboxylates of lead, cobalt, iron, nickel, zinc and tin such as dibutyltin dilaurate, dioctyltin maleate, dibutyltin diacetate, dibutyltin dioctoate, stannous acetate, stannous octoate, lead naphthenate, zinc caprylate, cobalt naphthenate and the like. Tin carboxylates, especially dibutyltin dilaurate (DBTDL) and dioctyltin maleate, are particularly effective promotors. When employed, the promotors are used at levels from about 0.001 up to about 0.5 wt. % and, more preferably, from about 0.002 to about 0.2 wt. %.

The following examples illustrate the invention; however, those skilled in the art will recognize numerous variations which are within the spirit of the invention and scope of the claims.

Melt strength was determined by measuring the amount of sag obtained with molded sheets at 210° C. For the tests, melt blends were obtained by mixing all of the components in a Brabender mixer (bowl temperature 210° C.) for 1 minute. The melt was then directly transferred to a 10×10× 0.1 inch mold. Molded sheets (0.1 inch thick) were obtained by pressing the compositions between two plates at a pressure of 30 tons for 15 minutes. To determine melt strength, the molded sheet was clamped on a metal rack so that only the edges of the sheet contacted the metal frame and an approximately 7×7 inch area of the sheet was suspended above the bottom of the frame. The suspended sheet was then placed in a 210° C. oven for 30 minutes and the amount of sag recorded in inches. If the sheet sagged 6" in less than 30 minutes, the sample was designated as having failed and the approximate time at which 6" sag occurred reported.

EXAMPLE 1

A mineral filled thermoformable composition having improved melt strength was prepared in accordance with the invention. The composition was obtained by blending 69 wt. % TPO (MFR 2 g/10 min; ethylene content 12%), 20 wt. % talc (median diameter 1.1 microns) and 10.5 wt. % of a mixture of plastomer and silane copolymer (wt. ratio 2.5:1). The plastomer used was an ethylene-octene-1 copolymer (density 0.87 g/cm$^3$; MI 5 g/10 min) and the silane copolymer was an ethylene-VTMOS copolymer (density 0.923 g/cm$^3$; MI 1.5 g/10 min; 1.7 wt. % VTMOS). Also included in the formulation was 0.5 wt. % of a commercial fatty acid metal soap/amide dispersion agent. Molded sheets prepared from the composition had excellent melt strength. After the 30 minute test period, the sheets prepared using the composition of the invention had sagged only about 2½ inches.

COMPARATIVE EXAMPLES II AND III

To demonstrate the improved results obtained with the compositions of the invention and the need to utilize both the ethylene polymer plastomer and ethylene-silane polymer, two comparative formulations were prepared using the same ingredients as in Example I except that, in the first case (Comparative Example II), the plastomer was omitted and, in the second formulation (Comparative Example III), the silane copolymer was omitted. The formulations were comprised as follows:

|  | Comp. Ex. II | Comp. Ex. III |
|---|---|---|
| Base Resin (wt. %) | 76.5 | 72 |
| Talc (wt. %) | 20 | 20 |
| Plastomer (wt. %) | — | 7.5 |
| Silane Polymer (wt. %) | 3 | — |
| Dispersion Aid | 0.5 | 0.5 |

Molded sheet prepared using Comparative Example II failed the sag test having sagged 6" in approximately 26 minutes. Molded sheet prepared using the Comparative Example III also failed the sag test. This sample had sagged 6" after only about 8 minutes at 210° C.

The above results demonstrate the need to use a combination of plastomer and silane copolymer with the talc-filled TPO to achieve improved melt strength.

EXAMPLES IV-VII

Example I was repeated except that the amount of the ethylene polymer component and the ratio of plastomer to silane polymer was varied. All of the ingredients used were the same as in Example I. Compositions were as follow:

|  | EX IV | EX V | EX VI | EX VII |
|---|---|---|---|---|
| Base Resin (wt. %) | 71.5 | 74 | 67 | 62 |
| Talc (wt. %) | 20 | 20 | 20 | 20 |
| Plastomer (wt. %) | 5 | 2.5 | 7.5 | 7.5 |
| Silane Polymer (wt. %) | 3 | 3 | 5 | 10 |
| Dispersion Aid | 0.5 | 0.5 | 0.5 | 0.5 |

All of the compositions passed the sag test. The molded sheet prepared using the composition of Example IV (wt. ratio plastomer:silane polymer 1.7:1) sagged only about 2½" after 30 minutes. The molded sheet obtained using Example V (weight ratio plastomer:silane polymer 1:1.2) sagged only about 1¾" during the 30 minute test period. Molded sheet prepared using the product of Example VI (weight ratio plastomer:silane polymer 1.5:1) sagged only approximately 1½" after 30 minutes. The molded sheet produced using Example VII blend (weight ratio plastomer:silane polymer 1:1.3) sagged less than 1" after 30 minutes heating at 210° C.

COMPARATIVE EXAMPLE VIII

A comparative formulation was prepared in accordance with Example 1 except the weight ratio of plastomer to silane polymer was increased to 7.5:1. The composition contained 71 wt. % TPO, 20 wt. % talc, 7.5 wt. % plastomer, 1 wt. % silane polymer and 0.5 wt. % dispersion aid. All of the ingredients used were the same as described in Example I. When the composition was molded into sheet and evaluated in the sag test, the sheet failed, i.e., sagged 6", in approximately 15 minutes.

EXAMPLE IX

Example VI was repeated except that the talc loading was increased to 30 wt. % and the TPO weight percentage proportionately reduced. The melt strength of the resulting blend was outstanding. Over the 30-minute test interval, the molded sheet formed using the highly filled blend had not even sagged 1". When the silane polymer is omitted from the formulation, molded sheet produced therefrom fails in the sag test in approximately 10 minutes.

EXAMPLE X

To demonstrate the ability to vary the TPO base resin the following composition was prepared and evaluated. The blend was comprised of 67.25 wt. % TPO (MFR 1 g/10 min; ethylene content 15%), 20 wt. % talc and 12.5 wt. % of a plastomer/silane polymer mixture (wt. ratio 1.5:1). For this blend 0.25 wt. % of a promotor (1.4% dibutyltindilaurate in LDPE) was also included. After 30 minutes at 210° C. molded sheet prepared using this blend sagged approximately 5 inches.

EXAMPLE XI

The formulation of Example I was repeated using a TPO having an MFR of 2 g/10 min and ethylene content of 5%. The formulation, which had an MFR of 2.5 g/10 min, exhibited superior melt strength. In the sag test only about 4 inches of sag was obtained after heating at 210° C. for 30 minutes. Moreover, the suitability of the composition for the production of thermoformed articles is evident from the following physical properties which were measured in accordance with conventional ASTM test procedures.

| Flexural Modulus (ASTM D 790): | |
|---|---|
| Crosshead speed | 0.05 in/min |
| 1% Secant modulus | 211700 PSI |
| 2% Secant modulus | 168800 PSI |
| Young's modulus | 234300 PSI |

| Tensile Properties (ASTM D 638): | |
|---|---|
| Yield | 3450 PSI |
| Yield Elongation | 7.1% |
| Break | 2570 PSI |
| Break Elongation | 130% |

| Dynatup (ASTM D 3763): | |
|---|---|
| Temperature | −22° F. |
| Impact velocity | 7.24 ft/sec |
| Maximum load | 764 lbs |
| Total energy | 31.64 ft-lbs |
| Thickness | 125 mils |
| Percent and type of failure | 80% Ductile, 20% Brittle |

| Izod Impact (ASTM D 256): | |
|---|---|
| Complete failures impact resistance | 1.28 ft-lbs/in |
| Complete failures impact resistance | 0.85 ft-lbs/in |

We claim:

1. A filled propylene polymer composition having improved melt strength comprising:

(a) 50 to 85 weight percent propylene-ethylene copolymer base resin having a melt flow rate from 0.1 to 30 g/10 min and containing from 1 to 30 weight percent ethylene;

(b) 5 to 35 weight percent mineral filler; and (c) 5 to 25 weight percent ethylene polymer component consisting of (i) an ethylene-$C_{4-8}$ α-olefin plastomer and (ii) a silane-containing polymer having 0.1 to 20 weight percent vinyltrimethoxysilane or vinyltriethoxysilane incorporated by copolymerization or grafting, the weight ratio of (i) to (ii) ranging from 2:5:1 to 1:2.

2. The composition of claim 1 wherein the propylene-ethylene copolymer is a thermoplastic polyolefin comprised of a crystalline propylene homopolymer phase and an ethylene-propylene rubber phase and having an ethylene content from 6 to 20 weight percent.

3. The composition of claim 1 wherein the mineral filler is selected from the group consisting of calcium carbonate, clay, talc, kaolinite, wollastonite, pyrophillite, magnesium hydroxide, oxides of zinc and magnesium, silica and silicates.

4. The composition of claim 3 wherein the mineral filler is talc having an average particle size between 0.2 and 10 microns.

5. The composition of claim 1 wherein the ethylene-$C_{4-8}$ α-olefin plastomer has a density of 0.86 to 0.92 $g/cm^3$ and melt index from 0.1 to 50 g/10 min.

6. The composition of claim 5 wherein the plastomer is a copolymer of ethylene and butene-1, hexene-1 or octene-1 and has a density of 0.86 to 0.90 $g/cm^3$ and melt index of 1 to 20 g/10 min.

7. The composition of claim 1 wherein the silane-containing polymer is a high density polyethylene or low density polyethylene grafted with from 0.25 to 7.5 weight percent vinyltrimethoxysilane.

8. The composition of claim 1 wherein the silane polymer is a copolymer of ethylene and 0.25 to 7.5 weight percent vinyltrimethoxysilane.

9. The composition of claim 1 which additionally contains 0.01 to 1 weight percent of a dispersing aid selected from the group consisting of maleated polypropylenes, silanes, neoalkoxy titanates, fatty acid metal soaps, fatty acid amides, fatty acid esters and low molecular weight aliphatic resins.

10. The composition of claim 1 which additionally contains 0.001 to 0.5 weight percent of a promoter selected from the group consisting of dibutyltin dilaurate, dioctyltin maleate, dibutyltin diacetate, dibutyltin dioctoate, stannous acetate, stannous octoate, lead naphthenate, zinc caprylate and cobalt naphthenate.

11. The composition of claim 1 comprised of 55 to 80 weight percent (a), 7.5 to 30 weight percent (b) and 7.5 to 20 weight percent (c).

12. The composition of claim 11 wherein (a) is a thermoplastic polyolefin comprised of a crystalline propylene homopolymer phase and an ethylene-propylene rubber phase and having an ethylene content from 1 to 30 weight percent, (b) is talc, (c) (i) is a copolymer of ethylene and butene-1, hexene-1 or octene-1 and has a density of 0.86 to 0.90 $g/cm^3$ and melt index of 1 to 20 g/10 min, and (c) (ii) is a copolymer of ethylene and 0.25 to 7.5 weight percent vinyltrimethoxysilane.

13. The composition of claim 11 having a melt flow rate of 0.1 to 30 g/10 min.

* * * * *